United States Patent Office 3,716,838
Patented Feb. 13, 1973

3,716,838
DATA PROCESSING SYSTEM WITH SELECTIVE CHARACTER ADDRESSING OF SYSTEM STORE
Albert Le Messurier Beard, Phoenix, Ariz., assignor to Honeywell Information Systems Inc.
Filed Aug. 24, 1970, Ser. No. 66,170
Int. Cl. G06f 3/00
U.S. Cl. 340—172.5                            1 Claim

ABSTRACT OF THE DISCLOSURE

A multiprocessor data processing system, wherein a plurality of processors are provided access to the system store through a central controller, and wherein the controller automatically responds to each address supplied by a processor to provide for the transfer of a data character between the processor and a particular portion of a data word storage cell represented by said address.

BACKGROUND OF THE INVENTION

This invention relates to multiprocessor data processing systems, and more particularly to data processing systems in which a plurality of processors are provided selective access to portions of the addressable cells of the system store.

A multiprocessor system comprises a plurality of data processors, a system data store, and a plurality of input devices and output devices. The data processors process data by executing separate programs or program parts simultaneously. The system store stores data to be processed, data which is the result of processing, and programs for controlling the processing operations of the data processors. The input devices supply programs and data to be processed and the output devices receive and utilize processed data. Communication must be provided for the data processors to receive programs and data to be processed from the system store and to transmit processed data to the system store. In a common type of multiprocessor system, one or more input/output processors provide common control and data transmission centrals for a plurality of input devices and a plurality of output devices. Accordingly, communication must also be provided for the input/output processors to transfer programs and data to be processed to the system store from the input devices and to transfer processed data from the system store to the output devices.

Each data processor of a multiprocessor system executes a program separately from the programs being executed by the other data processors. The program comprises a set of instructions, each instruction specifying a discrete type of processing operation. A data processor executes a program by sequentially responding to each of the instructions of the program to perform the corresponding operation. The data processor obtains the instructions of a program in sequence from a set of storage locations or "cells," in the system store. Each such cell is identified by a unique identifier, termed an "address." Thus, in obtaining the instructions of a program in proper sequence, the data processor supplies the corresponding addresses in sequence. Additionally, many of the instructions during execution require the data processor to further communicate with the system store, either to obtain a data item on which the data processor is to perform an operation, or to store a data item which is the result of an operation. Accordingly, each instruction requiring the transfer of a data item between the data processor and the system store must also identify the cell which is to supply or receive the data item. The data capacity of each of these cells is a fixed quantity in the data processing system being described herein, and the data contents of such a data cell is termed a "data word." Therefore, each program requires a set of cells in system store for storing and supplying data words, such data words including data words to be processed by the program, data words which are the result of processing operations performed by the program, and instructions of the program.

Each input/output processor of a multiprocessor system performs control and data transmission operations for its respective set of input and output devices separately from the operations being performed by the other input/output processors and separately from the programs being executed by the data processors. An input/output processor controls the storage of the data words provided by each of its associated input devices in their respective sets of cells in the system store. Thus, in transferring the data words supplied in succession by a particular input device, an input/output processor supplies in sequence the addresses of the cells of a cell set for receiving and storing these data words. Similarly, data words for transmission to each of its associated output devices are obtained by an input/output processor from a set of cells of the system store. Thus, in transferring data words in succession to a particular output device, an input/output processor also supplies in sequence the addresses of the cells of a cell set storing these data words.

In providing the management control functions effecting the transfer of data words between plural processors and the system store, it has been one form of practice to employ a central controller. The central controller is coupled to transmit data words to and receive data words from both the system store and each processor. Upon receipt of a request by a processor for access to the system store, the central controller employs an address supplied by the requesting processor to control the transmission of a data word from the requesting processor and the entry of this data word into the addressed store cell, or to control the retrieval of a data word from the addressed store cell and the transmission of this data word to the requesting processor.

In many types of data processing operations, the data word is divided into a plurality of portions termed "characters." Each character may represent a decimal number, an alphabetic symbol, or some other special symbol. Therefore, it is desirable in the instant type of data processing system to provide the processors with the capability to selectively address the individual characters of data words stored in the system store. With the selective access provided thereby, a processor can request a particular character from the store for use in processing or can change a particular character of a data word in its cell in the system store without modifying the remainder of the data word. One arrangement for providing the processors with single character accessibility to the system store is described in U.S. Pat. 3,483,526 by J. F. Couleur for Data Processing System Having Variable Character Length, the complete specification for which may be found in U.S. Pat. 3,413,613. However, the arrangement described in the Couleur patent provides the capability of accessing characters of a data word in the system store only during the execution of certain predetermined instructions by a data processor, and does not provide this capability as a regular part of the system store addressing function. Accordingly, it is desirable to provide a data processing system of the type described in which during all addressing of the system store individual characters in the addressed data word cell are made accessible.

Therefore, it is the principal object of this invention to provide for improved character accessing in a multiprocessor data processing system.

Another object of the instant invention is to provide a general character addressing capability in a data processing system of the type wherein plural processors communicate with the system store.

SUMMARY OF THE INVENTION

The foregoing objects are achieved according to the instant invention by providing, in a multiprocessor data processing system, a central controller which interprets all storage cell addresses as comprising both a word address portion and a character address portion. The word address portion repesents the address of a data word cell in the system store and the character address portion represents the particular portion of the addressed data word cell to which access is requested. For each store access request made by a processor a corresponding address is provided thereby. The central controller responds to each such request and interprets the accompanying address. If the character address portion designates that the requesting processor be provided access with only a particular character of the addressed data word cell, the controller provides for transfer of the designated character between the requesting processor and the system store. However, if the character address portion designates a requirement for a complete data word, the controller provides for transfer of the designated data word between the requesting processor and the system store.

BRIEF DESCRIPTION OF THE DRAWING

The invention will be described with reference to the accompanying drawing, wherein.

DESCRIPTION OF THE PREFERRED EMBODIMENT

Figure 1:
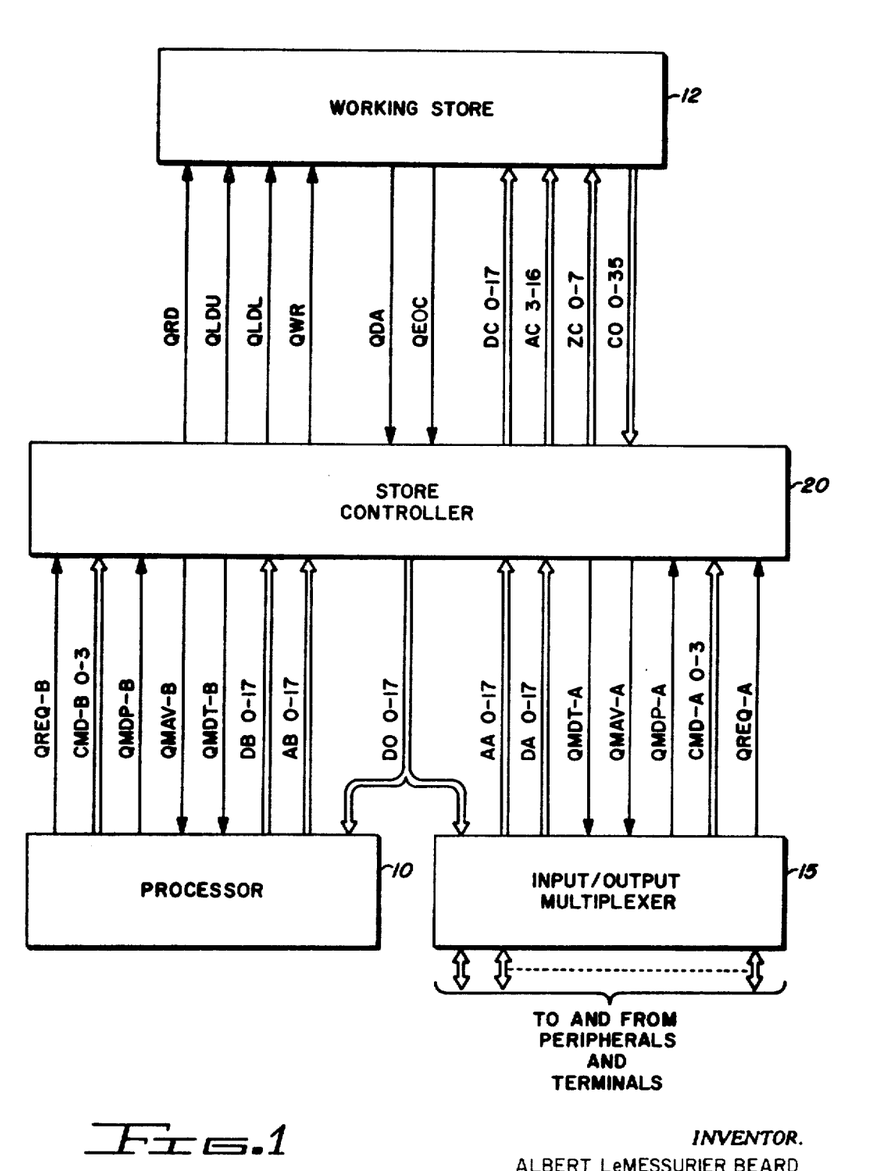
FIG. 1 is a block diagram of a multiprocesnor data processing system to which the instant invention is applicable.

The multiprocessor system of FIG. 1 is adapted to process large amounts of information very rapidly by performing many different processing operations simultaneously. This system comprises one or more data processors 10, of which only one is shown. Each data processor 10 responds to a respective plurality of distinct instructions to perform a particular data processing operation on the information received thereby. Each such plurality of instructions is known as a program. The instructions of a program are supplied to a data processor in the sequential order necessary to control the data processor to execute a particular data processing operation.

The system data store comprises a working store 12, which includes one or more computer "memories." Working store 12 stores data words representing information which is to be processed, data words representing information which is the result of processing, and data words representing instructions of the programs to be executed by the data processors. Each such data word is stored in a discrete storage location or cell, in working store 12.

Each data processor 10 communicates with working store 12 to receive data words from therefrom. Following execution of certain steps of the data processing operation, the data processor transmits the resulting data words to the working store for storage.

One or more input/output processor 15, termed herein input/output multiplexers, are provided. The input/output multiplexer executes special instructions to function as an automatic information transfer apparatus, providing communication between the system of FIG. 1 and external devices (not shown). These external devices supplying information for processing, supply programs to process the information, and receive the processed result information. Some external devices function as sources of information and programs; such as magnetic tape handlers, punch card readers, and electric typewriters. Each of these source devices stores information and programs as mechanical representations and converts these representations to corresponding electrical signals for receipt by multiplexer 15, which, in turn, controls the transfer of these signals to working store 12. Other external devices function to receive the processed information and convert it to a form useful to the system user. For example, magnetic tape handlers and card punchers receive processed information and store it as mechanical representations for subsequent use, whereas high-speed printers, cathode ray devices, and electric typewriters display the information for immediate use. Multiplexer 15 receives electrical signals representing the processed information from working store 12 and controls the transfer of these signals to the external devices for corresponding storage or display.

A central controller, such as 20, directs and schedules all communication between the processors, such as data processor 10 and input/output multiplexer 15, and working store 12. The store controller 20 is adapted to operate with a variable number of processors and working stores, and, accordingly, this invention is not limited to a system comprising either a predetermined number of processor or a predetermined number of working stores. Store controller 20 schedules and coordinates each processor request for communication with the working store, such request being either for retrieval of a data word or data character from the working store or for storage of a data word or data character in the working store. In performing such scheduling and coordination, store controller 20 temporarily assigns a memory of working store 12 to the requesting processor for communication. Additionally, store controller 20 schedules and transmits data words and data characters between the requesting processor and working store.

Forms of store controllers generally useful for the communication, direction, and scheduling required are described in the aforementioned Pats. 3,413,613 and 3,483,-526, and in U.S. Pat. 3,444,525 by J. P. Barlow et al. for Centrally Controlled Multicomputer System.

The multiprocessor system of FIG. 1 processes information represented by the binary code. With the binary code, each element of information is represented by a binary digit, sometimes termed a "bit," each binary digit being either a 1 or a 0. In the instant system the binary 1 may be represented by a relatively positive electrical signal and a binary 0 by a relative negative electrical signal.

The unit of information primarily employed in processing is termed the data word. The data word in the system of FIG. 1 comprises 18 bits. Two types of data words are employed, the operand word and the instruction word.

The operand word is a data word on which an arithmetic or logical operation is performed by a data processor 10, or which is the result of a data processing operation performed by a data processor. Thus, the operand word represents information which is to be processed and which is received from the working store by a data processor, or information which is the result of processing and which is transmitted to the working store by a data processor. Input/output multiplexer 15 is a processor employed to transfer operand words from source external devices to the working store or from the working store to receiving external devices.

The instruction word is employed by a data processor to direct a discrete step in the data processing operation being executed. The instruction word is received from the working store by a data processor. Although input/output multiplexer 15 functions to transfer instruction words from source external devices to the working store, it ordinarily does not transfer instruction words from the working store to receive external devices.

Most of the instruction words comprise command and address portions. The command represents the type of step to be executed by a data processor, so that when an instruction is received by a data processor, the command controls the data processor to execute the represented step. The instruction address is a representation of a location in working store from which on operand word is to be retrieved for processing or in which a processed operand word is to be stored. Generally, the instruction addresses of a program represent a series of locations in working store from which information to be processed is obtained, a series of locations in working store in which processed information is to be stored, and a series of locations in working store in which the incomplete results of intermediate processing steps are stored.

Two types of operand words are processed, a binary numeric word and an alphanumeric word. The entire binary numeric operand word represents a single number of 18 binary bits. The alphanumeric operand word represents a plurality of characters. The alphanumeric character represents any one of the decimal numerals 0–9, any one of the letters of the alphabet and certain other special symbols, such as punctuation marks, etc. Characters comprising either six bits or nine bits are employed; therefore, an operand word comprises either two nine-bit characters or three six-bit characters.

The 18 binary digits of a data word are accorded successively decreasing order of numerical significance, depending on their respective positions in the word. The first binary digit of an operand word is the most significant bit (left-most) and the 18th binary digit is the least significant bit (right-most). The first bit is designated as bit–0 and the succeeding bits are similarly designated in order from left to right the right-most bit being bit–17. The left-most alphanumeric character in an operand word is accorded highest significance and the succeeding characters are accorded decreasing significance from left to right. The most significant character is designated as character–0 for both size characters. For words with nine-bit characters, character–0 comprises bit–0 through bit–8. The remaining character–1 comprises bit–9 through bit–17. The six-bit character–0 comprises bit–0 through bit–5, the next six-bit character–1 comprises bit–6, through bit–11, and the least significant six-bit character–2 comprises bit–12 through bit–17.

Figure 3:
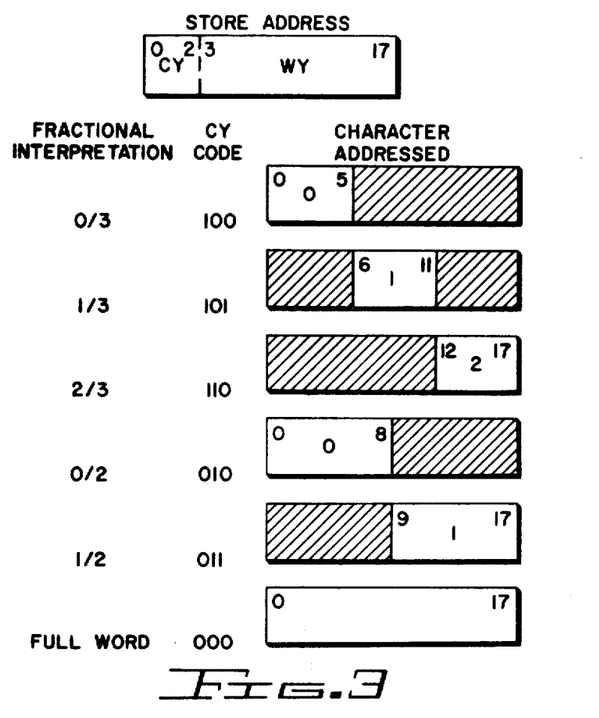
FIG. 3 is a representation of the character address codes employed in embodiment described.

In the instant invention, each working store address, FIG. 3, is interpreted by controlled 20 as comprising two portions. The portion WY comprising bits 3–17 is interpreted to represent the address in working store 12 of a complete data word, regardless of the form of the data word or of the type of characters which the data word comprises. The portion CY of the address comprising bits 0–2 is interpreted to represent the address of a particular character within the complete data word addressed by the word address portion WY. Thus, each store address provides for the selective addressing of any character within any data word held in working store. If the full data word, rather than a single character thereof, is to be addressed, the character address portion is 000.

Figure 2B:
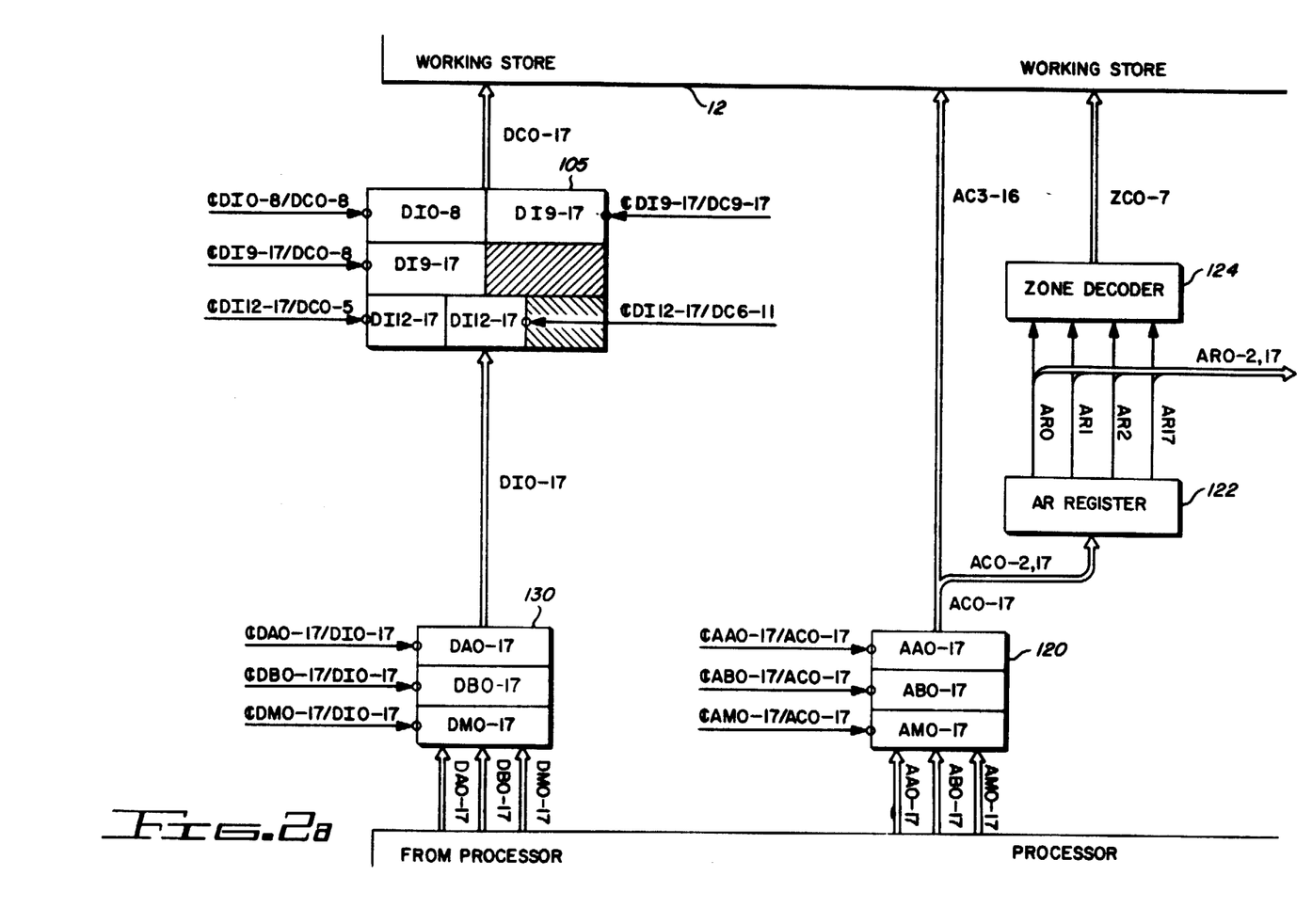
FIGS. 2a to 2b and 2c when arranged as shown in FIG. 2d form a composite block diagram of one embodiment of a central controller implementing the instant invention.
Figure 2C:
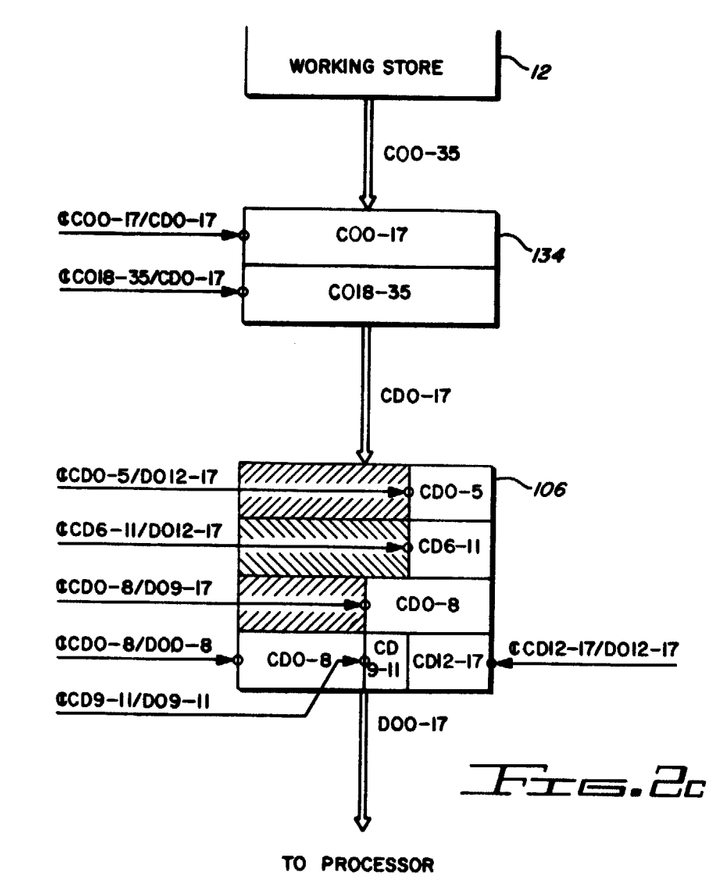
Figure 2D:
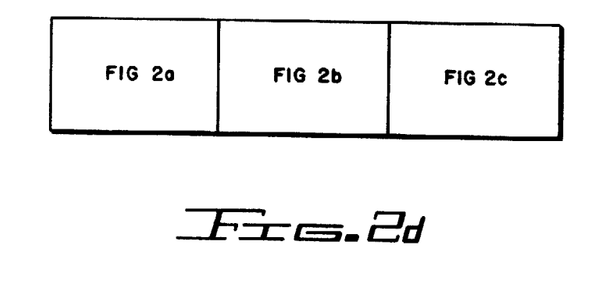

An embodiment of the central controller which implements the instant invention is shown in detail in FIGS. 2a to 2c which illustrate the major components of store controller 20 and the major control and data signal transfer paths thereof. Thus, these figures illustrate the signal paths which operationally couple together the major components of the store controller and which operationally couple the store controller to the processors and to the working store. However, FIGS. 2a to 2c show only those components and signals required for an understanding of the instant invention. It is to be understood that the store controller comprises additional components for performing other functions and generates corresponding signals in order to completely direct and schedule all communications between the processors and working store. Details of these other components and functions for a complete store controller are provided in the aforementioned patents.

The store controller may be employed with a plurality of working stores, a plurality of data processors, and a plurality of input/output processors. By way of example, the store controller of FIGS. 2a, 2b and 2c is shown to be coupled to a single working store and to three processors, which may be data processors or input/output processors. These processors will be designated respectfully as processor–A, processor–B, and processor–M. A processor generally will be designated as processor–($i$). The data and control signals particularly transmitted or received by these processors are designated with the corresponding suffix A, B, or M, and generally with the suffix ($i$). The portions of the store controller coupled to receive data from and transmit data to the processors are generally termed "ports."

The primary control element of the store controller disclosed in controlled logic 101 (FIG. 2b). Control logic 101 controls the overall operation of store controller 20, delivering external control signals for controlling the transfer of data words between the processors and the working store, and internal control signals (prefixed by the symbol $\phi$) on leads 102 in response to the granting of processor's requests for memory access. Particularly, control logic 101 responds to character address signals provided by a processor granted access to working store to control the transfer of a character between the requesting processors and the character portion of a working store cell designated by these signals.

An input data word shifter 105 (FIG. 2a) provides selection of the particular character to be entered into working store 12 during a working store write operation. Specifically, input shifter 105 responds to control signals delivered by control logic 101 to provide transfer of the least significant character in the data word supplied by the requesting processor to the particular portion of the addressed working store cell represented by the character address signals provided by this processor.

An output data word shifter 106 (FIG. 2c) provides for transfer to a processor of the particular character retrieved from working store 12 during a working store read operation. Specifically, output shift 106 responds to control signals delivered by control logic 101 to provide transfer of the particular character retrieved from the addressed working store cell and represented by the character address signals provided by the requesting processor to the least significant character position in the data word transmitted to this processor.

In addition, store controller 20 comprises further supporting components. Request cells and scan logic 110 (FIG. 2b) receive processor requests for access to working store 12, as represented by the respective signals QREQ–($i$), accepts these requests in sequence according to predetermined priorities allocated to the processors, and for each processor for which the request is granted, delivers a corresponding signal SEL–($i$) to control logic 101. A command bus switch 112 controls the transfer of a selected store controller command, represented by the signals CMD–($i$)0–3, from the bus on which it is supplied by a processor to a command register 114. Switch 112 is enabled by a control signal corresponding to the particular processor granted access to working store to select the store controller command supplied on a corresponding command bus by such processor. The particular command selected by switch 112 is delivered to command register 114 as signals CS0–3. Command register 114 holds each store controller command during the period required for the store controller to execute such command. A store controller command denotes the type of operation to be performed by the store controller for the acknowledged processor. In the instant description, only two of these commands will be described: the working store read command, to control the store controller to retrieve information from working store and transfer it to the processor, and the working store write command, to control the store controller to receive information from the processor and insert it into working store. Command register 114 delivers signals CR0-3, representing the command stored therein, to control logic 101.

An address bus switch 120 (FIG. 2a) controls the transfer of a selected working store address, represented by the signals A(i)0-17, from the bus on which it is supplied by a processor in part to working store 12 and in part to an AR register 122. Switch 120 is enabled by a control signal corresponding to the particular processor granted access to working store to select the working store address supplied on a corresponding address bus by such processor. Switch 120 transmits bits 0-2 and 17, signals AC0-2, 17, of the selected address to AR register 122. AR register 122 stores a representation of bits 0-2 and 17 of the selected address during the operation of the store controller provided for the corresponding processor. AR register 122 delivers signals AR0-2, 17 representing the address bits stored therein, to a zone decoder 124 and to control logic 0101 101 (FIG. 2b). Zone decoder 124 responds to the four address signals received thereby to deliver one or more of eight zone signals ZC0-7 to the working store to control the entry therein of the particular data character or data word represented by an address selected by switch 120.

An input data bus switch 130 controls the transfer of a selected data word, represented by the signals D(i)0-17, from the bus on which it is supplied by a processor to input data word shifter 105. Switch 130 is enabled by a control signal corresponding to the particular processor granted access to working store, if said processor requests a working store write operation, to select the data word supplied on a corresponding data bus by such processor. The particular data word selected by switch 130 is delivered to input data word shifter 105 as signals DI0-17. Signals DC0-17, capable of representing a full data word but which bear only the essential information required by the character address CY of the selected address, are transmitted by shifter 105 to working store 12.

An output data bus switch 134 (FIG. 2c) controls the transfer of a selected one of two adjacent data words supplied by working store 12 as signals CO0-35 to output data word shifter 106. Switch 134 is enabled by a control signal corresponding to bit-17 of the selected address to select either the odd-addressed or even-addressed data word retrieved from working store during a read operation. The particular data word selected by switch 134 is delivered to output data word shifter 106 as signals CD0-17. Signals DO0-17, capable of representing a full data word but which bear only the essential information required by the character address CY of the selected address, are transmitted by shifter 106 to the processors.

The significance of the various control signals transferred between store controller 20 and the processors and working store will now be defined, with reference to FIG. 1. A plurality of control signals QREQ-(i), QMDP-(i), QMAV-(i), and QMDT-(i) are transferred between store controller 20 and a corresponding processor-(i) to represent the different phases of each operation of communication between the store controller and processor-(i). The signal QREQ-(i), transmitted by processor-(i) to store controller 20, represents a request by processor-(i) to be granted access to working store 12. The signal QMDP-(i), transmitted by processor-(i) to store controller 20, represents either that a data word has been supplied by processor-(i) on its data bus D(i)0-17 during a working store write operation or that processor-(i) has received a data word from data bus DO0-17 during a working store read operation. The signal QMAV-(i), transmitted by store controller 20 to processor-(i), represents that the store controller has granted the request of processor-(i) and accepted the accompanying working store address supplied by processor-(i), thereby releasing processor-(i) to prepare a new address for its next working store access request. The signal QMDT-(i), transmitted by store controller 20 to processor-(i), represents either that working store 12 has received a data word supplied by processor-(i) during a working store write operation or that a data word has been supplied by working store 12 on data bus DO0-17 during a working store read operation.

A plurality of control signals QRD, QWR, QLDU, QLDL, QDA, QEOC, and ZC0-7 are transferred between store controller 20 and working store 12 to represent different phases of each operation of communication between the store controller and the working store. The signal QRD, transmitted by store controller 20 to working store 12, controls the working store to initiate a read operation. In the ensuing read operation the working store retrieves two adjacent data words and delivers them as signals CO0-35 to the store controller. One of these two data words is retrieved from the even-addressed working store cell represented by bits 3-16 of the address supplied, signals AC3-16, and the other data word is retrieved from the next higher odd-addressed working store cell. The signal QWR, transmitted by store controller 20 to working store 12, controls the working store to initiate a write operation. In the ensuring write operation the working store is adapted to alter any portion of two adjacent data words, either the even-addressed working store cell represented by bits 3-16 of the address supplied, or the next higher odd-addressed working store cell. The signal QLDU, transmitted by store controller 20 to working store 12, represents during a write operation that the upper or even-addressed cell, as represented by bits 3-16 of the address, is the cell whose contents are to be altered. The signal QLDL, transmitted by store controller 20 to working store 12, represents during a write operation that the lower or odd-addressed cell immediately above the even-addressed cell represented by bits 3-16 of the address is the cell whose contents are to be altered.

The signal QDA, transmitted by working store 12 to store controller 20, represents either that the working store has received a data word from data bus DC0-17 during a working store write operation or that a data word has been supplied by the working store on data bus CO0-35 during a working store read operation. The signal QEOC, transmitted by working store 12 to store controller 20, represents that the operation requested of the working store has been completed and that store controller 20 may now initiate access for another processor.

The signals ZC0-7, transmitted by store controlled 20 to working store 12, represent during a working store write operation the particular character portions of the addressed working store cell to be altered. The significance of each of these eight signals is tabulated below:

TABLE I

| Zone control signal: | Controls alteration of working store bits |
|---|---|
| ZC0 | 0-5 |
| ZC1 | 6-8 |
| ZC2 | 9-11 |
| ZC3 | 12-17 |
| ZC4 | 18-23 |
| ZC5 | 24-26 |
| ZC6 | 27-29 |
| ZC7 | 30-35 |

Thus, signals ZC0-ZC3 control the alteration of selected portions of the even-addressed cell to which access is provided in a write operation and signals ZC4-ZC7 control alteration of selected portions of the corresponding odd-addressed cell to which access is provided during the same write operation.

OPERATION OF THE INVENTION

The operation of the invention will now be described by providing a description of the operation of store controller 20 during its control of a working store read operation and a working store write operation.

Referring now to FIG. 2, a working store read operation is requested by a processor supplying a request signal, a command representing a working store read operation, and an address. By way of example, it will be assumed that processor–B requests a read operation and thereby supplies the request signal QREQ–B, the command signal set CMD–B0–3 representing a working store read operation, and the address signal set AB0–17. It will be further assumed, by way of example, that in the address signal set the word address portion WY represents the address of working store cell 3200 and the character address portion CY represents the most significant six-bit character portion of the addressed cell. Accordingly, bits 0–2 of the address represents the code 100 (FIG. 3). Thus, the CY portion, conjointly with the WY portion, denote that the six-bit character–0 of cell 3200 is the word portion to be retrieved and transferred to processor–B.

Scan logic 110 receives the request of processor–B and, if the working store is not busy at that time, grants the request. However, if the working store is busy the request is queued until the working store becomes free, whereupon scan logic 110 grants one of the pending requests according to a predetermined priority schedule. When scan logic 110 grants the request of processor–B, responding to the receipt of request signal QREQ–B, it transmits the SEL–B signal to control logic 101 to denote that the request of processor B has been granted, that other control signals transmitted by processor B now must be recognized, and that the store controller must be prepared to transmit a data word between processor–B and the working store.

In response to signal SEL–B, control logic 101 provides for store controller 20 to accept the command and address supplied by processor–B. Control logic 101 generates the control signals ¢CMD–B0;3/CS0–3, ¢QCR, and

¢AB0–17/AC0–17

The signal ¢CMD–B0–3/CS0–3 enables command bus switch 112 to transfer therethrough the command supplied by processor–B on signals CMD–B0–3. This command is delivered to command register 114 as output signals CS0–3 of switch 112. The signal ¢QCR enables command register 114 to accept the new command signals CS0–3 for storage during the ensuing read operation. The signals CR0–3, representative of the read command contents of command register 114, are applied to control logic 101. The signal ¢AB0–17/AC0–17 enables address bus switch 120 to transfer therethrough the address supplied by processor–B on signals AB0–17. Bits 3–16 of the WY portion of this address are delivered directly to working store 12 by switch 120 as signals AC3–16. Bits 0–2 and 17 of the address are delivered to AR register 122 as output signals AC0–2, 17 of switch 120. The AR register thereupon receives and stores both the character address portion of the supplied address and bit 17 of the word address portion. The signals AR0–2, 17, representative of the contents of AR register 122, are applied to control logic 101 and zone decoder 124. In the instant read operation the consequent output signals delivered by decoder 124 are not employed.

Control logic 101 now transmits the control signal QMAV–B to processor–B. The signal QMAV–B notifies processor–B that its request has been granted and that it should prepare to receive the requested information from the working store. Additionally, the signal QMAV–B serves to notify processor–B that the address supplied thereby has been accepted by store controller 20, so that the processor can commence preparation of a new address for its next request for communication with the working store.

In response to the command signals CR0–3, representing a working store read operation, control logic 101 delivers the control signal QRD to working store 12 to initiate the required read operation. In conjoint response to the signals CR0–3 and AR17, the latter signal representing the least significant bit of the address which in this instance is a binary 0 because the cell address is an even number, control logic 101 generates the control signal ¢CO0–17/CD0–17. The signal ¢CO0–17/CD0–17 enables output data bus switch 134 to transfer therethrough the data word retrieved from the even-addressed store cell during the ensuing read operation and delivered to store controller 20 as signals CO0–17. This selected data word is delivered to output data word shifter 106 as output signals CD0–17 of switch 134. In conjoint response to the signals CR0–3 and AR0–2, the latter signals representing in this instance the six-bit character–0 of the addressed cell, control logic 101 generates the control signal

¢CD0–5/DO12–17

Figure 4:
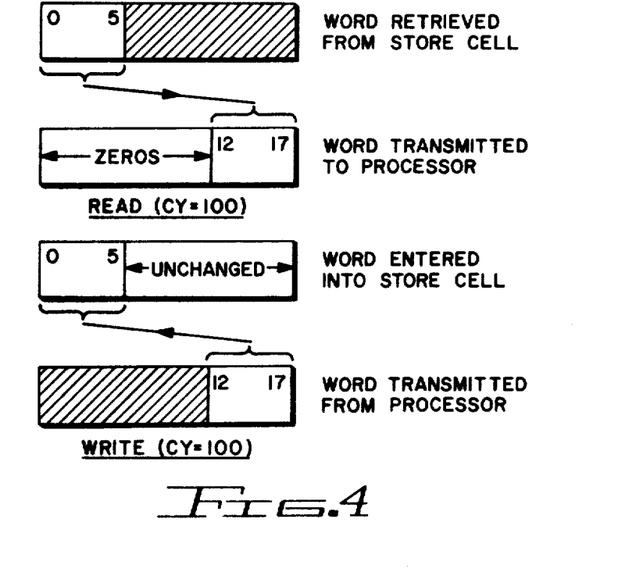
FIG. 4 is a representation of selective character transfers effected by the invention.

The signal ¢CD0–5/DO12–17 enables output data word shifter 106 to shift the six-bit character–0 received from the working store, bits CD0–5, to the least significant six-bit character position, bits DO12–17, in the data word transmitted to the requesting processor. Additionally, the signal ¢CD0–5/DO12–17 provides binary zeros in the bits DO0–11 which are transmitted to the processor. This read operation example is represented in the upper portion of FIG. 4.

In response to QRD signal, working store 12 initiates a read operation. Working store 12 employs the word address portion represented by signals AC3–16 to retrieve the corresponding even-addressed data word and the data word in the next higher odd-addressed cell. In the instant example, the working store retrieves the data words in cells 3200 and 3201. The retrieved data words are transmitted to output data bus switch 134, the even-addressed word being represented by signals CO0–17 and the odd-addressed word being represented by signals CO18–35. At the time that working store 12 transmits the retrieved data words to store controller 20 it also transmits thereto the control signal QDA to denote that the requested data word is now available on data bus CO0–35.

Output data bus switch 134, enabled by control signal ¢CO0–17/CD0–17, transmits therethrough the data word retrieved from cell 3200. This data word is transmitted to output data word shifter 106 as signals CD0–17.

Output data word shifter 106, enabled by control signal ¢CD0–5/DO12–1 shifts the six-bit character–0 in the data word received from working store, bits CD0–5, to the least significant six-bit character position, bits DO12–17, in the data word now trasmitted to processor–B. Additionally, the signal ¢CD0–5/DO12–17 provides binary zeros in bits DO8–11. Accordingly, the particular character requested from working store is transmitted to processor–B in the least significant character position of the 18 signal bits DO0–17.

At this time, in response to the QDA signal, control logic 101 transmits the signal QMDT–B to processor–B to notify such processor that the information requested thereby is now available on data bus DO0–17.

Responding to the QMDT–B signal, processor–B accepts the requested character from data bus DO0–17. Processor–B then transmits the signal QMDP–B to store controller 20 to denote that it has received the information on data bus DO0–17 and that its request has been satisfied.

Working store 12, a predetermined time after delivering the retrieved data word to store controller 20, transmits thereto the QEOC signal. The QEOC signal notifies the store controller that the working store has completed the read operation and that the store controller may now initiate access for another processor.

The operation of the invention will now be described for other types of addresses supplied by a processor requesting a read operation. If the requesting processor requires information from an odd-addressed cell, for example, cell 3201, the signal AR17 is a binary 1. Accordingly, control logic 101 generates the control signal

¢CO18–35/CD0–17

This control signal enables output data bus switch 134 to transfer therethrough the data word retrieved from the odd-addressed store cell during the ensuing read operation and delivered to store controller 20 as signals CO18–35. This selected data word is the delivered to output data word shifter 106 as output signals CD0–17 of switch 134.

If the requesting processor requires the six-bit character-1 of the addressed cell, it supplies a character address of 101, FIG. 3. Accordingly, control logic 101 generates the control signal ¢CD6–11/DO12–17. This control signal enables output data word shifter 106 to shift the six-bit character-1 received from working store, bits CD6–11, to the last significant six-bit character position, bits DO12–17, in the data word transmitted to the requesting processor. Additionally, the signal ¢DC6–11/DO12–17 provides binary zeros in the bits DO0–11 which are transmitted to the processor.

If the requesting processor requires the six-bit character-2 of the addressed cell, it supplies a character address of 110. Accordingly, control logic 101 generates the control signal ¢CD12–17/DO12–17. This control signal enables output data word shifter 106 to transfer therethrough the six-bit character-2 received from working store, bits CD12–17, to the least significant six-bit character position, bits DO12–17, of the data word transmitted to the requesting processor. Additionally, the signal ¢CD12–17/DO12–17 provides binary zeroes in the bits DO0–11 which are transmitted to the processor.

If the requesting processor requires the nine-bit character-0 of the addressed cell, it supplies a character address of 010, FIG. 3. Accordingly, control logic 101 generates the control signal ¢CD0–8/DO9–17. This control signal enables output data word shifter 106 to shift the nine-bit character-0 received from working store, bits CD0–8, to the least significant nine-bit character position, bits DO9–17, in the data word transmitted to the requesting processor. Additionally, the signal ¢CD0–8/DO9–17 provides binary zeros in the bits DO0–8 which are transmitted to the processor.

If the requesting processor requires the nine-bit character-1 of the addressed cell, it supplies a character address of 011. Accordingly, control logic 101 generates the control signals ¢CD9–11/DO9–11 and ¢CD12–17/DO12–17. These two control signals enable output data word shifter 106 to transfer therethrough the nine-bit character-1 received from working store, bits CD9–17, to the least significant nine-bit character position, bits DO9–17, of the data word transmitted to the requesting processor. In addition, these two control signals provide binary zeroes in the bits DO0–8 which are transmitted to the processor.

If the requesting processor requires the complete data word in the addressed cell, it supplies a character address of 000, FIG. 3. Accordingly, control logic 101 generates the control signals ¢CD0–8/DO0–8, ¢CD9–11/DO9–11, and ¢CD12–17/DO12–17. These three control signals enable output data word shifter 106 to transfer therethrough the entire word received from working store, bits CD0–17, to the requesting processor as bits DO0–17.

A working store write operation is requested by a processor supplying a request signal, a command representing a working store write operation, an address, and a data word comprising information for storage. By way of example, it will be assumed that processor–B requests a write operation and thereby supplies the request signal QREQ–B, the command signal set CMD–B0–3 representing a working store write operation, the address signal set AB0–17, and the data word signal set DB0–17. It will be further assumed, by way of example, that in the address signal set the word address portion WY represents the address of working store cell 3200 and the character address portion CY represents the most significant six-bit character portion of the addressed cell. Accordingly, bits 0–2 of the address represent the code 100, FIG. 3. Thus, the CY portion, conjointly with the WY portion, denote that a six-bit character supplied by the requesting processor must be inserted into the six-bit character–0 portion of cell 3200.

Scan logic 110 receives the request of processor–B and, if the working store is not busy at that time, grants the request. However, if the working store is busy the request is queued until the working store becomes free, whereupon scan logic 110 grants one of the pending requests according to a pretermined priority schedule. When scan logic 110 grants the request of processor–B, responding to the receipt of the request signal QREQ–B, it transmits the SEL–B signal to control logic 101 to denote that the request of processor–B has been granted, that other control signals transmitted by processor–B now must be recognized, and that the store controller must be prepared to transmit a data word between processor–B and the working store.

In response to signal SEL–B, control logic 101 provides for store controller 20 to accept the command and address supplied by processor–B. Control logic 101 generates the control signals ¢CMD–B0–3/CS0–3, ¢QCR, and

¢AB0–17/AC0–17

The signal ¢CMD–B0–3/CS0–3 enables command bus switch 112 to transfer therethrough the command supplied by processor–B on signals CMD–B0–3. This command is delivered to command register 114 as output signals CS0–3 of switch 112. The signal ¢QCR enables command register 114 to accept the new command signals CS0–3 for storage during the ensuing write operation. The signals CR0–3, representative of the write commond contents of command register 114, are applied to control logic 101. The signal ¢AB0–17/AC0–17 enables address bus switch 120 to transfer therethrough the address supplied by processor–B on signals AB0–17. Bits 3–16 of the WY portion of this address are delivered directly to working store 12 by switch 120 as signals AC3–16. Bits 0–2 and 17 of the address are delivered to AR register 122 as output signals AC0–2, 17 of switch 120. The AR register thereupon receives and stores both the character address portion of the supplied address and bit 17 of the word address portion. The signals AR0–2, 17, representative of the contents of AR register 122, are applied to control logic 101 and zone decoder 124. Zone decoder 124 responds to the signals AR0–2, 17 to deliver zone control signal ZC0 for controlling alteration of the working store cells bits 0–5, Table I, these bits comprising the character–0 portion of the even-addressed word into which informaiton will be entered by the write operation.

Control logic 101 now transmits the control signal QMAV–B to processor–B. The signal QMAV–B notifies processor–B that its request has been granted and that it should prepare to transmit the information to be stored to the working store. Additionally, the signal QMAV–B serves to notify processor–B that the address supplied thereby has been accepted by store controller 20, so that the processor can commence preparation of a new address for its next request for communication with the washing store. In response to the QMAV–B signal processor–B transmits the QMDP–B signal to store controller 20 to notify the store controller that a data word is now available on data bus DB0–17.

Upon receipt of the QMAV–B signal and in response to the command signals CR0–3 representing a working store write operation, control logic 101 delivers the control signal QWR to working store 12 to initiate the required write operation and generates the control signal ¢DB0–17/DI0–17. The signal ¢DB0–17/DI0–17 enables input data bus switch 130 to transfer therethrough the data word supplied by processor-B as signals DB0–17. This selected data word is delivered to input data word shifter 105 as output signals DI0–17 of switch 130. In conjoint response to the signals CR0–3 and AR17, the latter signal representing the least significant bit of the address, which in this instance is a binary 0 because the cell address is an even number, control logic 101 delivers the QLDU signal to working store 12 to denote that the contents of the upper or even-addressed cell are to be altered during the ensuing write operation. In conjoint response to the signals CR0–3 and AR0–2, the latter signals representing in this instance the six-bit character–0 of the addressed cell, control logic 101 generates the control signal ¢DI12–17/DC0–5. The signal

¢DI12–17/DC0–5 enables input data word shifter 105 to shift the character in the least significant six-bit character portion of the data word received from the processor, bits DI12–17, to the six-bit character–0 position, bits DC0–5, in the data word transmitted to the working store. Bits DC6–17 play no part in the instant write operation. This write operation example is represented in the lower portion of FIG. 4.

Input data bus switch 130, enabled by control signal ¢DB0–17/DI0–17, transmits therethrough the data word supplied by processor-B. This data word is transmitted to input data word shifter 105 as signals DI0–17.

Input data word shifter 105, enables by control signal ¢DI12–17/DC0–5, shifts the character in the least significant six-bit character portion, bits DI12–17, of the data word received from the processor to the six-bit character–0 position, bits DC0–5, in the data word now transmitted to the working store. Accordingly, the particular character provided by processor-B in the least significant character position of the 18 signal bits DB0–17 is transmitted to the working store in the particular character position designated by the address supplied by processor-B.

In response to the QWR signal, working store 12 initiates a write operation. Working store 12 employs the word address portion represented by signals AC3–16 and the QLDU signal to enable altering the corresponding even-addressed data word. In the instant example, the working store is enabled to alter the contents of cell 3200. However, only selected portions of the stored data word in cell 3200 are permitted to be altered, these portions being denoted by the ones of signals ZC0–7 received by the working store. In the instant example since zone decoder 124 generates only zone control signal ZC0, only bits 0–5 of the contents of cell 3200 are permitted to be altered. Accordingly, working store 12 accepts only the six-bit character–0 bits DC0–5, from the input data word. This accepted character is entered into the character–0 position of cell 3200, the remaining contents of cell 3200, as well as the contents of cell 3201, remaining unchanged by the instant operation. The working store then transmits the signal QDA to store controller 20 to denote that it has received the information on data bus DC0–17.

In response to the QDA signal, control logic 101 transmits the signal QMDT-B to processor-B to notify such processor that the working store has received the information supplied thereby and that the request of processor-B has been satisfied.

Working store 12, a predetermined time after accepting the data word supplied by store controller 20 transmits thereto the QEOC signal. The QEOC signal notifies the store controller that the working store has completed the write operation and that the store controller may now initiate access for another processor.

The operation of the invention will now be described for other types of addresses supplied by a processor requesting a write operation. If the requesting processor requires information to be inserted into an odd-addressed cell, for example cell 3201, the signal AR17 is a binary 1. Accordingly, control logic 101 delivers the QLDL signal to working store 12 to denote that the contents of the lower or odd-addressed cell are to be altered during the ensuing write operation. Additionally, zone decoder 124 generates only zone control signal ZC4, since only bits 0–5 of the contents of cell 3201 (bits 18–23 of the double-word comprising cells 3200 and 3201) are permitted to be altered. Accordingly, working store 12 accepts only the six-bit character–0, bits DC0–5, from its input data word and enters this character into the six-bit character–0 position of cell 3201, the remaining contents of cell 3201 as well as the contents of cell 3200 remaining unchanged by this write operation.

If the requesting processor requires the insertion of a six-bit character into the six-bit character-1 portion of the addressed cell, it supplies a character address of 101. Accordingly, control logic 101 generates the control signal ¢DI12–17/DC6–11. This control signal enables input data word shifter 105 to shift the character in the least significant six-bit character portion, bits DI12–17, of the data word received from the processor to the six-bit character–1 position, bits DC6–11, of the data word transmitted to the working store. Additionally, zone decoder 124 generates the zone control signals ZC1 and ZC2 to control working store 12 to accept only the six-bit character–1, bits DC6–11, from its input data word.

If the requesting processor requires the insertion of a six-bit character into the six-bit character–2 portion of the addressed cell, it supplies a character address of 110. Accordingly, control logic 101 generates the control signal ¢DI9–17/DC9–17. This control signal enables input data word shifter 105 to transfer therethrough the least significant nine bits, bits DI9–17, of the data word received from the processor to the least significant nine bit portion, bits DC9–17, of the data word transmitted to the working store. Additionally, zone decoder 124 generates the zone control signal ZC3 to control working store 12 to accept only the six-bit character–2, bits DC12–17, from its input data word.

If the requesting processor requires the insertion of a nine bit character into the nine bit character–0 portion of the addressed cell, it supplies a character address of 010. Accordingly, control logic 101 generates the control signal ¢DI9–17/DC0–8. This control signal enables input data word shifter 105 to shift the character in the least significant nine bit character portion, bits DI9–17, of the data word received from the processor to the nine bit character–0 position, bits DC0–8, of the data word transmitted to the working store. Additionally, zone decoder 124 generates the zone control signals ZC0 and ZC1 to control working store 12 to accept only the nine bit character–0, bits DC0–8, from its input data word.

If the requesting processor requires the insertion of a nine-bit character into the nine bit character–1 portion of the addressed cell, it supplies a character address of 011. Accordingly, control logic 101 generates the control signal ¢DI9–17/DC9–17. This control signal enables input data word shifter 105 to transfer therethrough the character in the least significant nine-bit character portion, bits DI9–17, of the data word received from the processor to the nine bit character–1 position, bits DC9–17, of the data word transmitted to the working store. Additionally, zone decoder 124 generates the zone control signals ZC2 and ZC3 to control working store 12 to accept only the nine-bit character–1, bits DC9–17, from its input data word.

If the requesting processor requires the insertion of a complete data would into the addressed cell, it supplies a character address of 000. Accordingly, control logic 101 generates the control signals ¢DI0–8/DC0–8 and ¢DI9–17/DC9–17. These two control signals enable input data word shifter 105 to transfer therethrough the entire word, bits DI0–17, received from the processor to the working store as bits DC0-17. Additionally, zone decoder 124 generates the zone control signals ZC0, ZC1, ZC2, and ZC3 to control working store 12 to accept its entire input data word.

While principles of the invention have now been made clear in an illustrated embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claim is therefore, intended to cover and embrace any such modifications, within the limits only of the true spirit and scope of the invention.

I claim:

1. Improved data character selection apparatus in a data processing system of the type having a plurality of processors each executing a program comprising a sequence of data word operations in response to a corresponding sequence of instructions, said processors including at least one input/output processor connected to input devices and output devices, a storage system comprising at least one data storage member, said storage member storing a data word in each one of a plurality of addressable cells and a data character in each one of predetermined portions of said cells, a central controller including a controllable data transmission member, each of said processors coupled to said central controller and receiving data words from and transmitting data words to a first port of said transmission member, said storage member coupled to said central controller and receiving data words from and transmitting data words to a second port of said transmission member, wherein the improvement comprises:

an address bus switch in said first port receiving a store address from one of said processors when said one processor requires communication with said data storage member, said store address comprising a first signal set representing an address of one of said cells and a second signal set representing a selected character portion of said one cell;

said controller having means responsive to said first signal set for transferring to said storage member a third signal set representing said one cell address;

a register in said controller for storing said second signal set;

a zone decoder connected to said register and responsive to said second signal set to transmit at least one zone control signal to said storage member, said at least one zone control signal representing said selected character portion of said one cell;

control logic in said controller connected to said register and responsive to said second signal set to generate internal control signals;

an output data word shifter in said first port responsive to said internal control signals during a working store read operation to transfer therethrough data selected from said selected character portion of said one cell, said selected character portion being transferred to a predetermined portion of the data word for said requesting processor; and an input data word shifter in said second port responsive to said internal control signals during a working store write operation to transfer therethrough data to be stored in said selected character portion of said one cell, said selected character portion being transferred to a predetermined portion of the data word in said data storage member.

References Cited

UNITED STATES PATENTS

| | | | |
|---|---|---|---|
| 3,323,109 | 5/1967 | Hecht et al. | 340—172.5 |
| 3,317,898 | 5/1967 | Hellerman | 340—172.5 |
| 3,444,525 | 5/1969 | Barlow et al. | 340—172.5 |
| 3,516,073 | 6/1970 | Goss et al. | 340—172.5 |
| 3,251,037 | 5/1966 | Coil et al. | 340—172.5 |
| 3,292,158 | 12/1966 | Schneberger | 340—172.5 |
| 3,449,722 | 6/1969 | Tucker | 340—172.5 |
| 3,462,741 | 8/1969 | Bush et al. | 340—172.5 |

HARVEY E. SPRINGBORN, Primary Examiner